United States Patent
Park

(10) Patent No.: US 8,639,924 B2
(45) Date of Patent: Jan. 28, 2014

(54) METHOD FOR PROCESSING SECURE PROGRAM USING KEY DISTRIBUTION PROTOCOL IN SERVER/CLIENT

(75) Inventor: Jong Youl Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 114 days.

(21) Appl. No.: 13/315,926

(22) Filed: Dec. 9, 2011

(65) Prior Publication Data

US 2012/0151208 A1 Jun. 14, 2012

(30) Foreign Application Priority Data

Dec. 10, 2010 (KR) ........................ 10-2010-0126408

(51) Int. Cl.
*H04L 29/06* (2006.01)
(52) U.S. Cl.
USPC ............................ 713/160; 380/278; 380/279
(58) Field of Classification Search
USPC .................. 713/160, 165, 168; 380/278–279
See application file for complete search history.

(56) References Cited

U.S. PATENT DOCUMENTS

| | | | |
|---|---|---|---|
| 7,325,127 B2 * | 1/2008 | Olkin et al. .................... | 713/152 |
| 2007/0180266 A1 * | 8/2007 | Kang et al. ..................... | 713/189 |
| 2008/0178299 A1 * | 7/2008 | Merkle et al. ................... | 726/29 |
| 2009/0150681 A1 | 6/2009 | Kaabouch et al. | |

FOREIGN PATENT DOCUMENTS

KR 1020100039710 4/2010

* cited by examiner

*Primary Examiner* — Samson Lemma
(74) *Attorney, Agent, or Firm* — Nelson Mullins Riley & Scarborough LLP; Anthony A. Laurentano, Esq.; Dipti Ramnarain, Esq.

(57) ABSTRACT

Disclosed are a server and a client processing a security program by using a real-time distribution method and method of controlling the server and the client. A method of controlling a server processing a security program by using a real-time key distribution method according to an exemplary embodiment of the present invention includes: analyzing a security program for transmitting the security program to a client; decomposing a code of the analyzed security program into code blocks; encrypting the code blocks by using an encryption key; changing an original header of the security program to a first header; and transmitting a packed program including the encrypted code blocks and the changed first header to the client.

13 Claims, 6 Drawing Sheets

|  | SUCCESS OR FAILURE | | |
|---|---|---|---|
| PRIMARY CHECKING | × | ○ | ○ |
| SECONDARY CHECKING | — | × | ○ |
| EXECUTION OF SECURITY PROGRAM | — | — | ○ |

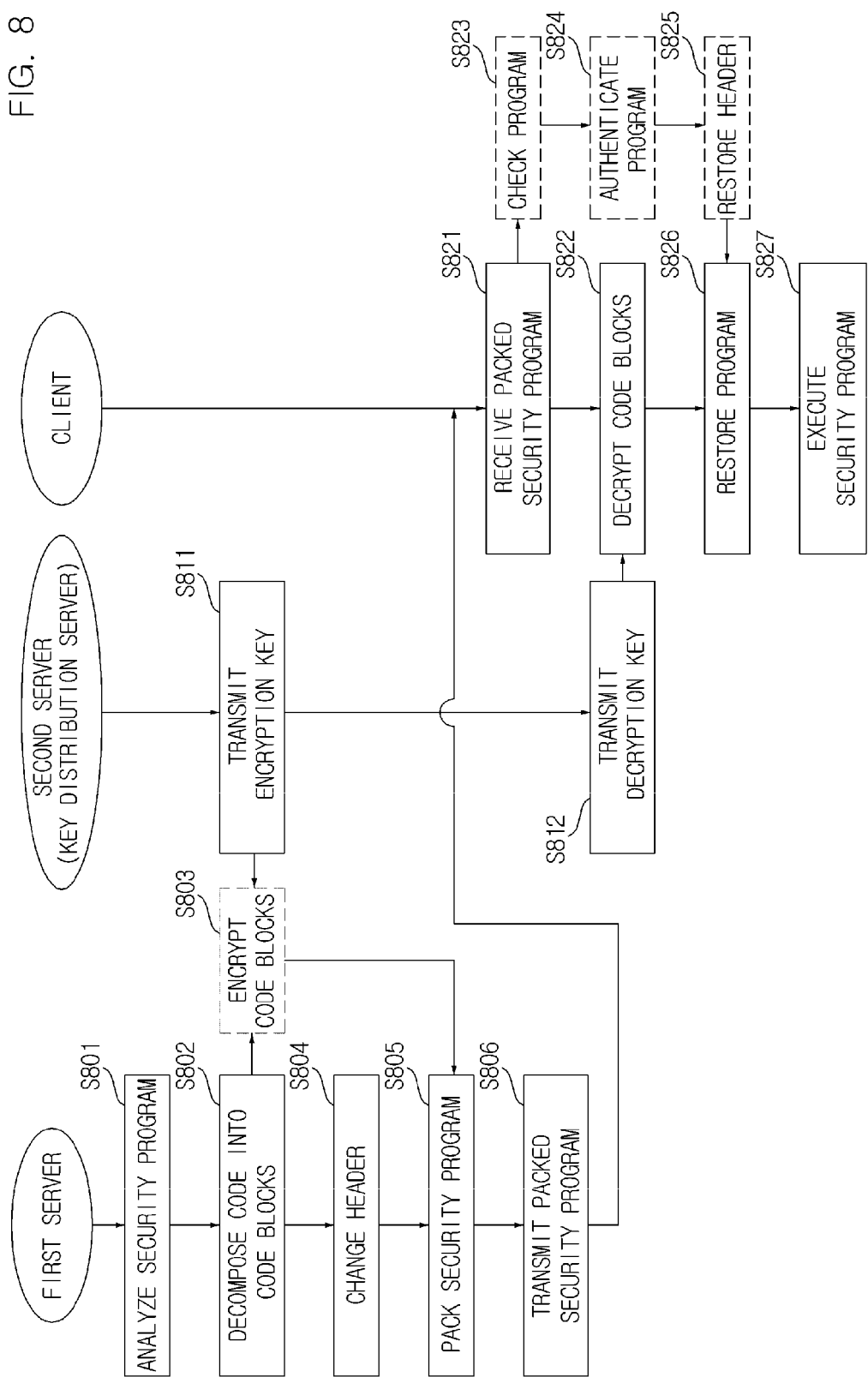

METHOD FOR PROCESSING SECURE PROGRAM USING KEY DISTRIBUTION PROTOCOL IN SERVER/CLIENT

CROSS-REFERENCE TO RELATED APPLICATIONS

This application claims priority to and the benefit of Korean Patent Application No. 10-2010-0126408 filed in the Korean Intellectual Property Office on Dec. 10, 2010, the entire contents of which are incorporated herein by reference.

TECHNICAL FIELD

The present invention relates to a protocol processing a security program, and more particularly, to a server and client for processing a security program using a real-time key distribution protocol and methods of controlling the server and the client.

BACKGROUND

In general, program packing is used for virus and software license management. For example, a virus program uses a method of hiding a code of the virus program or a method of encrypting and storing a code of the virus program in order to hide from a virus detector a fact that the virus program is a virus and has a malicious code. Further, the virus program has a feature in which the hidden code is activated in an execution stage when being primarily stored. Also, in the case of using program packing for software license management, at the early execution of the program, it is checked whether a user has a legal license. If the license is not legal, the program packing has a function of forcibly terminating the program.

However, if a general program packing technique is incorporated into a program for which security is more necessarily required, in the case where the program is hacked, serious data loss may occur. Further, in a service such as a real-time broadcasting service requiring a high security grade, in order to interrupt access of illegal users and prevent distribution of illegal contents, a security program is necessarily needed.

SUMMARY

The present invention has been made in an effort to provide a packing/unpacking technique using real-time key distribution in order to safely distribute a security program in a broadcasting environment (for example, IPTV broadcasting, bi-directional cable broadcasting, bi-directional satellite broadcasting) supporting on-line program distribution unlike a general-purpose packing technique.

Further, the present invention has been made in an effort to provide a download-based security platform without additional hardware cost by adding a function capable of encrypting a security code and controlling the encrypted security code through on-line key distribution in real time to a general packing/unpacking technique.

Further, the present invention has been made in an effort to provide a security system which improves security by interrupting access of a security program with a problem in coordination with a group key provided from a conditional access system (CAS) of a broadcasting system through an entitlement management message (EMM).

An exemplary embodiment of the present invention provides a method of controlling a server processing a security program by using a real-time key distribution method, the method including: analyzing a security program for transmitting the security program to a client; decomposing a code of the analyzed security program into code blocks; encrypting the code blocks by using an encryption key; changing an original header of the security program to a first header; and transmitting a packed program including the encrypted code blocks and the changed first header to the client.

Another exemplary embodiment of the present invention provides a method of controlling a client processing a security program by using a real-time key distribution method, the method including: receiving a packed program from a first server connected to the client through a network, the packed program including an encrypted code and a changed first header; restoring an original header from the changed first header of the packed program; unpacking the packed program by using a decryption key received from a second server, the decryption key corresponding to an encryption key used for the encrypted code; and executing a security program corresponding to the packed program when the unpacking is finished.

Yet another exemplary embodiment of the present invention provides a server processing a security program by using a real-time key distribution method, the server including: an analysis module analyzing the security program for transmitting the security program to a client; a decomposition module decomposing a code of the analyzed security program into code blocks; an encryption module encrypting the code blocks by using an encryption key; a changing module changing an original header of the security program to a first header; and a transmitting module transmitting a packed program including the encrypted code blocks and the first header to the client.

Still another exemplary embodiment of the present invention provides a client processing a security program by using a real-time key distribution method, the client including: a reception module receiving a packed program from a first server connected to the client through a network; a restoration module restoring an original header from the changed first header of the packed program; an unpacking module performing an unpacking process on the packed program by using a decryption key received from a second server, the decryption module corresponding to an encryption key used for the encrypted code; and an execution module executing a security program corresponding to the packed program when the unpacking process is finished.

According to the exemplary embodiments of the present invention, it is possible to provide a packing/unpacking technique using real-time key distribution in order to safely distribute a security program in a broadcasting environment (for example, IPTV broadcasting, bi-directional cable broadcasting, bi-directional satellite broadcasting) supporting on-line program distribution unlike a general-purpose packing technique.

Further, it is possible to provide a download-based security platform without additional hardware cost by adding a function capable of encrypting a security code and controlling the encrypted security code through on-line key distribution in real time to a general packing/unpacking technique.

Further, it is possible to provide a security system which improves security by interrupting access of a security program with a problem in coordination with a group key provided from a conditional access system (CAS) of a broadcasting system through an entitlement management message (EMM).

BRIEF DESCRIPTION OF THE DRAWINGS

FIG. 8 is a flow chart illustrating a method of controlling a server and a client processing a security program by using a real-time key distribution method according to another exemplary embodiment of the present invention.

DETAILED DESCRIPTION

Figure 1:
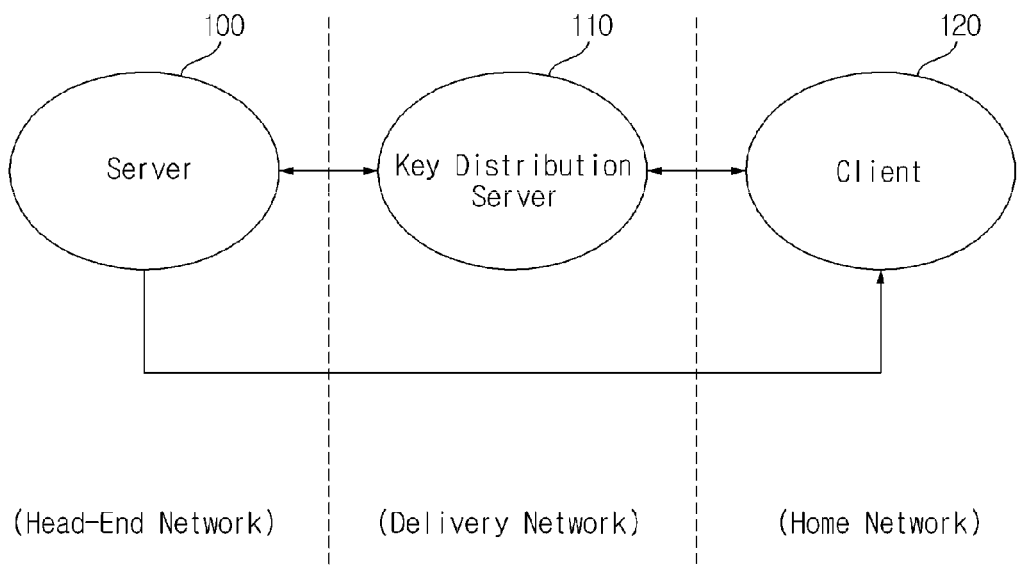
FIG. 1 is a view schematically illustrating a system for processing a security program using real-time key distribution protocol according to an exemplary embodiment of the present invention.

Hereinafter, exemplary embodiments of the present invention will be described in detail with reference to the accompanying drawings. In this description, when any one element is connected to another element, the corresponding element may be connected directly to another element or with a third element interposed therebetween. First of all, it is to be noted that in giving reference numerals to elements of each drawing, like reference numerals refer to like elements even though like elements are shown in different drawings. The components and operations of the present invention illustrated in the drawings and described with reference to the drawings are described as at least one exemplary embodiment and the spirit and the core components and operation of the present invention are not limited thereto.

Exemplary embodiments of the present invention may be achieved by various means. For example, exemplary embodiments of the present invention may be achieved by hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the exemplary embodiments of the present invention may be implemented in the form of a module, a procedure, a function, etc., performing the above-described functions or operations. Software code may be stored in a memory unit and executed by a processor. The memory unit is located at the interior or exterior of the processor and may transmit and receive data to and from the processor via various known means.

Throughout the specification, when one part is specified as being connected to another part, this includes not only a "direct connection," but also an "indirect connection," that is, they may be indirectly connected, with an intervening part therebetween. In addition, unless explicitly described to the contrary, the word "include" and variations such as "includes" or "including," will be understood to imply the inclusion of stated elements but not the exclusion of any other elements.

Also, the term "module" defines a unit that performs a particular function or operation, and this can be realized by hardware components, software components, or the combination of hardware and software components.

Specific terms used for the following description are provided to aid in understanding of the present invention. These specific terms may be replaced with other terms within the scope and spirit of the present invention.

The principle of operation of exemplary embodiments of the present invention will be described in detail with reference to the accompanying drawings. In the following description, well-known functions or construction are not described in detail since they would obscure the invention inunnecessary detail. Terms which will be described herein are defined by considering the functions thereof in the context of the present invention, and may vary depending on the intention of a user or an operator. Therefore, the meanings of the respective terms must be interpreted based on the details described in the general description of the present invention.

FIG. 1 is a view schematically illustrating a system for processing a security program using a real-time key distribution protocol according to an exemplary embodiment of the present invention. Hereinafter, a server, a key distribution sever, and a client of a system for processing a security program using a real-time key distribution protocol according to an exemplary embodiment of the present invention will be described with reference to FIG. 1.

A server 100 according the exemplary embodiment of the present invention packs a security program by performing decomposition, encryption, etc., and transmits the packed security program to a client 120 through a network (for example, an IP network, a cable network, a wireless network, etc.). The sever 100 encrypts a code of the security program by using an encryption key received from a key distribution server 110. Meanwhile, the client 120 primarily checks the packed program, restores an execution location of the original program through an unpacking process, and performs a decryption process by using a decryption key corresponding to the key used for the encryption. Then, the client 120 restores the original program through a process of restoring the security program and a start address of the program. That is, since the encryption key and the decryption key received from the key distribution server are used, it is possible to prevent execution of a security program with a problem in advance. This will be described below in more detail with reference to FIGS. 2 to 8.

Figure 2:
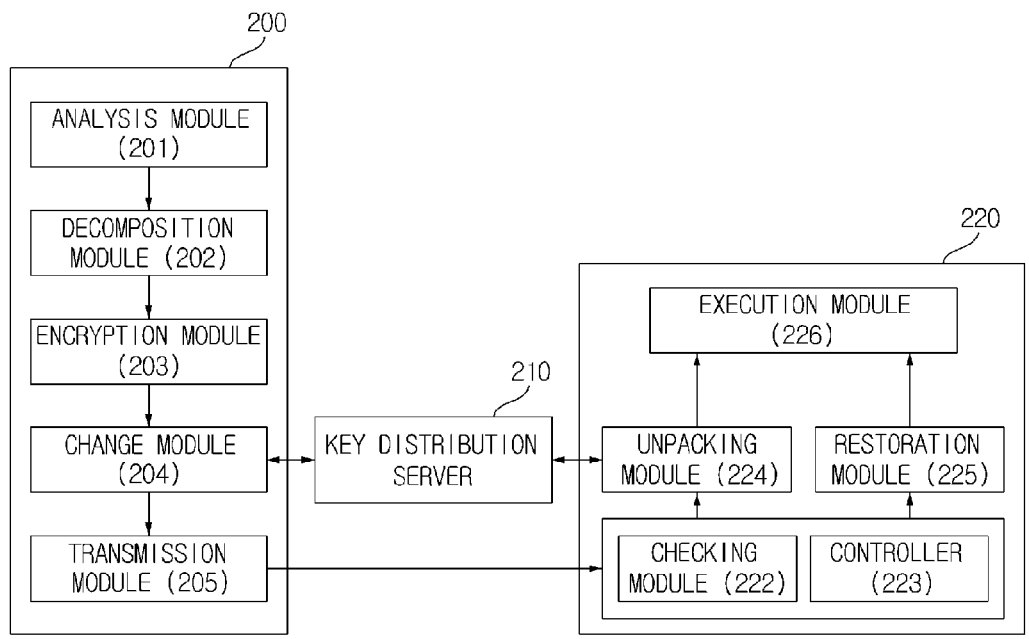
FIG. 2 is a view illustrating specific modules of a server, a key distribution server, and a client shown in FIG. 1 according to an exemplary embodiment of the present invention in more detail.

FIG. 2 is a view illustrating specific modules of the server, the key distribution server, and the client shown in FIG. 1 according to an exemplary embodiment of the present invention in more detail. Hereinafter, specific operation processes of the server, the key distribution server, and the client shown in FIG. 1 according to the exemplary embodiment of the present invention will be described with reference to FIG. 2.

As shown in FIG. 2, a server 200 according to the exemplary embodiment of the present invention includes an analysis module 201, a decomposition module 202, an encryption module 203, a change module 204, a transmission module 205, etc. However, this is an exemplary embodiment and the scope of the present invention should be defined by claims in principle.

The analysis module 201 analyzes a security program to be transmitted to a client 220, and the decomposition module 202 decomposes a code of the analyzed security program. Further, the encryption module 203 encrypts the decomposed code by using an encryption key, and the change module 204 changes an original header of the security program to a first header. Furthermore, the transmission module 205 transmits a packed program including the encrypted code and the changed first header to the client 220.

Also, the analysis module 201 sets a first location value of the code of the security program to be decomposed and sets a second location value of an additional code necessary for packing the security program.

Further, the encryption module 203 is configured to perform an encryption process using an encryption key received in real time from a key distribution server 210 connected to the server 200 through a network.

Meanwhile, the client 220 according to the exemplary embodiment of the present invention includes a reception module, an unpacking module 224, a restoration module 225, and an execution unit 226, and the reception module is configured to include a checking module 222 and a controller 223. However, this is an exemplary embodiment and the scope of the present invention should be defined by claims in principle.

The reception module receives a packed program from the server 200 connected to the client 220 through a network. The packed program includes, for example, a code encrypted and a first header changed by the server 200.

The restoration module 225 restores the original header from the changed first header of the packed program, and the unpacking module 224 performs an unpacking process on the packed program by using a decryption key received from the key distribution server 210. Here, the decryption key corresponds to the encryption key used for the encrypted code.

Then, in the case where the unpacking process is finished, the execution unit 226 is configured to execute the security program corresponding to the packed program.

Further, the checking module 222 of the reception module primarily checks whether there is a possibility that the received packed program has been hacked, and the controller 223 of the reception module controls the restoration process to be executed only when there is no possibility that the received packed program. In particular, the checking module 222 primarily checks a possibility of hacking by determining whether an environment in which the received packed program has been exposed to hacking and whether a hacking tool exists.

Figure 3:
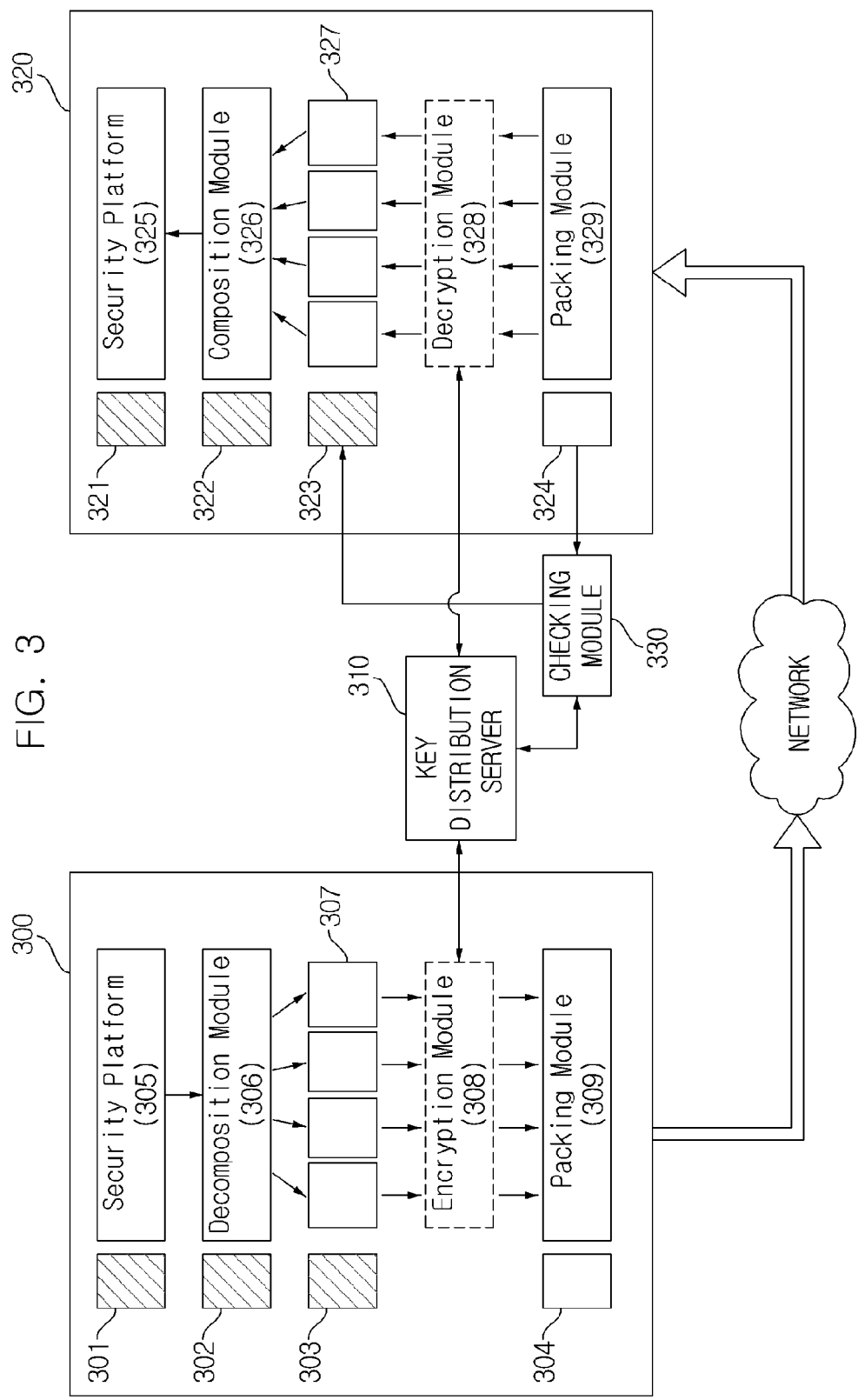
FIG. 3 is view illustrating specific modules of a server, a key distribution server, and a client shown in FIG. 1 according to another exemplary embodiment of the present invention in more detail.

FIG. 3 is a view illustrating specific modules of a server, a key distribution server, and a client shown in FIG. 1 according to another exemplary embodiment of the present invention in more detail. Hereinafter, specific modules of the server, the key distribution server, and the client shown in FIG. 1 according to another exemplary embodiment of the present invention will be described in more detail with reference to FIG. 3. It is sure that FIGS. 2 and 3 can be analyzed by being complementally applied.

As shown in FIG. 3, a server 300 according to another exemplary embodiment of the present invention is configured to transmit a security program and a client 320 according to another exemplary embodiment of the present invention is configured to execute a received security program.

A security platform 305 of the server 300 analyzes an original security program, and a decomposition module 306 is configured to decompose a code of the original security program into code blocks 307. An encryption module 308 encrypts the decomposed code and installs a checking module 330 by deforming an execution location of the security program, and a packing module 309 packs the encrypted data by using a header file 304 instead of an original header file 303.

Meanwhile, according to another exemplary embodiment of the present invention, in a security program checking system, two processes are distinguished from each other. The checking module 330 for a primary checking process is configured to be connected to the key distribution server 310 and receive a key distributed in real time. Further, the checking module 330 is configured to perform a work process of unpacking the packed security program by using a secondary checking block 327 for a secondary checking process. In this process, the secondary checking block 327 is encrypted and stored, and is decrypted and executed together with a code block of the security program. In particular, since the secondary checking block 327 is performed only when authenticated according to the operation of the checking module 330 described above, the security is further improved.

A client 320 receiving the packed security program performs an initialization operation for executing the original security program by using an unpacking module 329. Further, in the case where the checking module 330 is driven and authentication is successful, a header file 323 of the original program is restored by changing a header file 324 of the packed program. Here, restoring the header file means, for example, performing control so that the security program is normally executed at a normal program execution location. The packed security program includes normal program execution locations 301, 302, 303, 321, 322, and 323. However, the packed security program changes execution start locations to locations 304 and 324 of the checking module 330 and uses the locations 304 and 324.

In contrast, in the case where the checking module 330 is driven and the authentication fails, the execution of the security program is forcibly terminated. This is performed through communication with the key distribution server 310 as described above.

Further, the checking module 330 for primary checking is connected to the key distribution server 310 and receives a key necessary for unpacking, for example, only when normality is determined by checking whether an execution environment and hacking tools are driven. Also, two methods may be used to distribute the key. As an exemplary embodiment, a method of transmitting downloaded program information to the client and the server and receiving the key in real time may be used. As another exemplary embodiment, a method of sharing a group key in a conditional access system of broadcasting may be used. The conditional access system performs a function of checking whether the client or a user has legal reception authority and distributing a key through an entitlement management message (EMM). The distributed key value is used to distribute the security program. The key distribution servers of FIGS. 1 to 3 described above may implement the above-mentioned two exemplary embodiments.

The execution authority of the code blocks of the encrypted and packed security program depends on key values distributed by the key distribution server 310. That is, only when the decryption key mapped with the encryption key is normally received from the key distribution server 310, the code blocks 327 are recomposed and a composition module 326 restores the code. Also, since the code blocks 327 includes secondary checking blocks 327, even when authentication in the checking module 330 is successful, rechecking is performed through the secondary checking blocks 327.

The checking module 330 for primary checking is provided from, for example, a packing-technique supplier and the secondary checking blocks 327 are provided by a security program maker. Further, a decryption module 328 having received a right decryption key through communication between the checking module 330 and the key distribution server 310 decrypts the encrypted code blocks. Furthermore, unlike general code blocks, the normal headers 323, 322, and 321 are restored from the changed header 324 of the security program header part through the checking module 330.

For example, two exemplary embodiments are possible with the key provided by the key distribution server 310. As a first exemplary embodiment, when the security program is encrypted with a general key value, the whole security program is encrypted with one key and is supplied. Further, as a second exemplary embodiment, keys are structured in a tree form such that if knowing a root key, it is possible to see a lower key, and if knowing a key of an intermediate node, it is possible to see keys of lower nodes, and executable keys are distributed according to an authority. Also, since the code blocks 307 and 327 are encrypted with a plurality of keys and are transmitted, according to the grades of received keys, the whole code blocks may be restored, or a part of the code blocks may be restored, or only basic code blocks may be restored. Therefore, it is possible to improve the efficiency of the transmission.

That is, whenever the security program is driven, the client 320 according to another exemplary embodiment may attempt the procedure from the unpacking module 329 to a security platform 325, and may immediately interrupt access to the key distribution server 310 in the case where illegal hacking occurs.

Figures 4, 5:
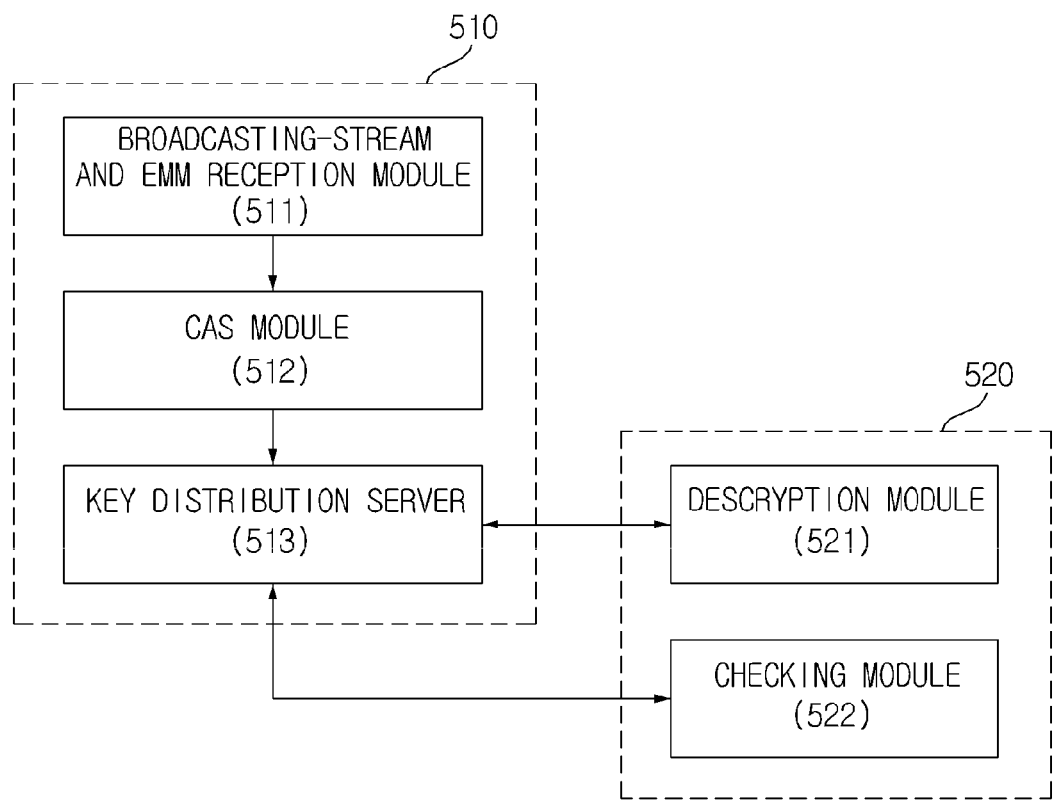
FIG. 4 is a view for explaining a process of performing primary checking and secondary checking before execution of a security program according to an exemplary embodiment of the present invention.
FIG. 5 is a view illustrating the key distribution server shown in FIG. 2 or 3 according to yet another exemplary embodiment of the present invention in more detail.

FIG. 4 is a view for explaining a process of performing primary checking and secondary checking before execution of a security program according to an exemplary embodiment of the present invention. Hereinafter, a process of performing primary checking and secondary checking before execution of a security program according to an exemplary embodiment of the present invention will be briefly described with reference to FIGS. 3 and 4.

The checking module of the client shown in FIG. 3 primarily checks whether the security program has been authenticated. As the result of the primary checking, if the security program has not been authenticated, as shown in FIG. 4, a process of unpacking the security program is not performed any further.

Meanwhile, as the result of the primary checking, if the security program has been authenticated, the secondary checking blocks located between the general code blocks are checked. As the result of the secondary checking on the secondary blocks, in the case of failure, as shown in FIG. 4, the process of unpacking the security program is not performed any more. In contrast, as the result of the secondary checking on the secondary blocks, in the case where there is no problem, as shown in FIG. 4, a normal unpacking process is performed on the security program and the security program is executed.

FIG. 5 is a view illustrating the key distribution server shown in FIG. 2 or 3 according to yet another exemplary embodiment of the present invention in more detail. Hereinafter, the key distribution server shown in FIG. 2 or 3 according to another exemplary embodiment of the present invention will be described in more detail with reference to FIG. 5.

As shown in FIG. 5, a system 510 including a key distribution server is connected to a client 520. Although detailed modules of the client are not shown, FIGS. 2 and 3 may be supplementarily analyzed.

According to yet another exemplary embodiment of the present invention, a key distribution server 513 is configured to be connected to a real-time CAS module. The key distribution server 513 process EMM data of a broadcasting stream received through a broadcasting-stream and EMM reception module 511 in coordination with the CAS module 512 and transmits a group key to a decryption module 521 of the client 520. Also, a checking module 522 is configured to perform network communication with a key distribution server 513. Meanwhile, in order to further improve the security, for example, the function of the key distribution server 513 is provided by a provider providing the CAS module 512.

Figure 6:
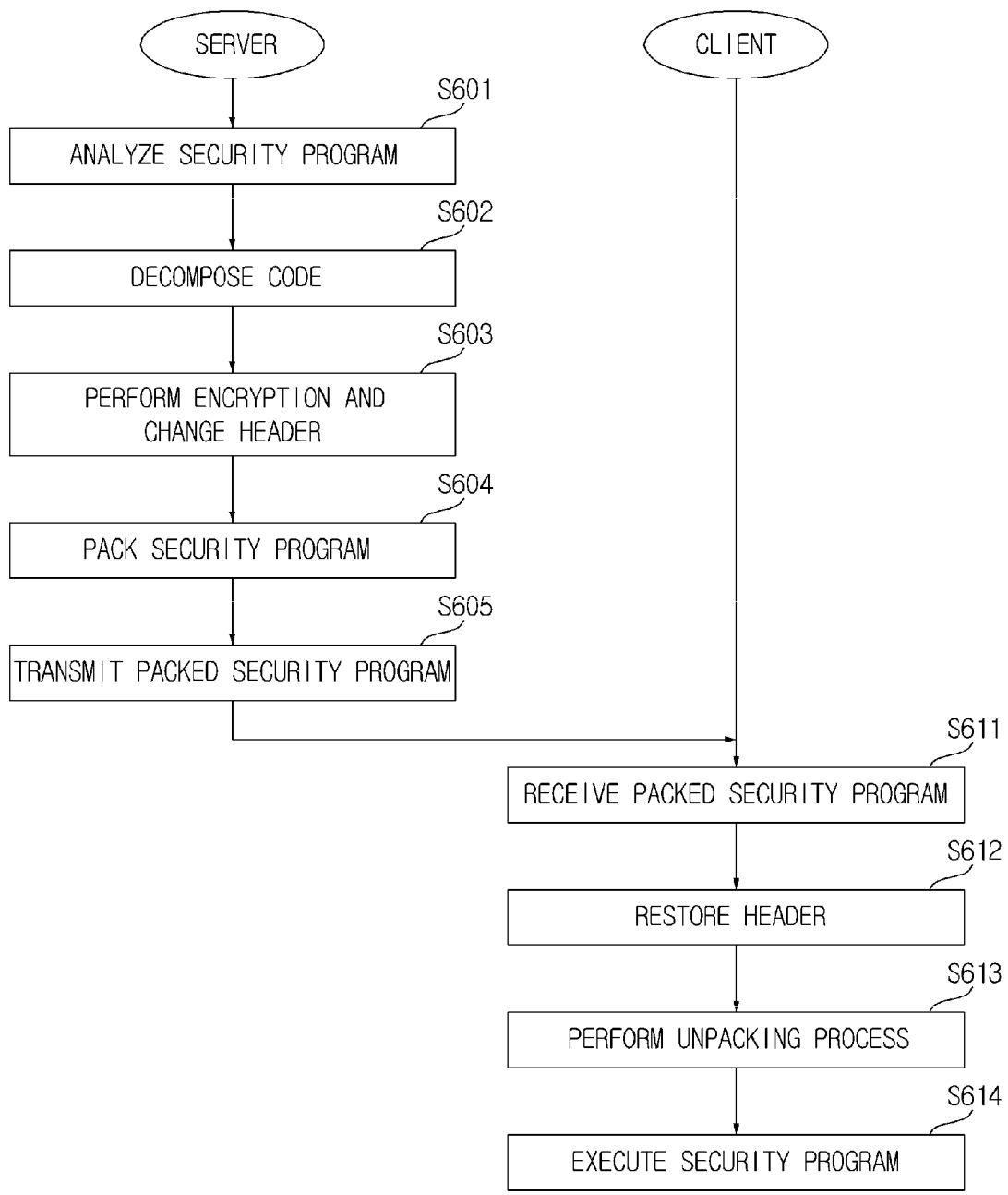
FIG. 6 is a flow chart illustrating a method of controlling a server and a client processing a security program by using a real-time key distribution method according to an exemplary embodiment of the present invention.

FIG. 6 is a flow chart illustrating a method of controlling a server and a client processing a security program by using a real-time key distribution method according to an exemplary embodiment of the present invention. Hereinafter, a method security program by using a real-time key distribution method according to an exemplary embodiment of the present invention will be described in chronological order with reference to FIG. 6. The method may be analyzed with reference to blocks shown in FIG. 2 in some cases.

The server configured according to an exemplary embodiment of the present invention to process the security program by using the real-time key distribution method analyzes the security program for transmitting the security program to the client (S601), and decomposes a code of the analyzed security program into code blocks (S602).

The server encrypts the decomposed code blocks by using an encryption key and changes the original head of the security program to a first header (S603). Also, the server packs the security program to include the encrypted code blocks and the changed first header (S604), and transmits the packed security program to the client (S605).

Figure 7:
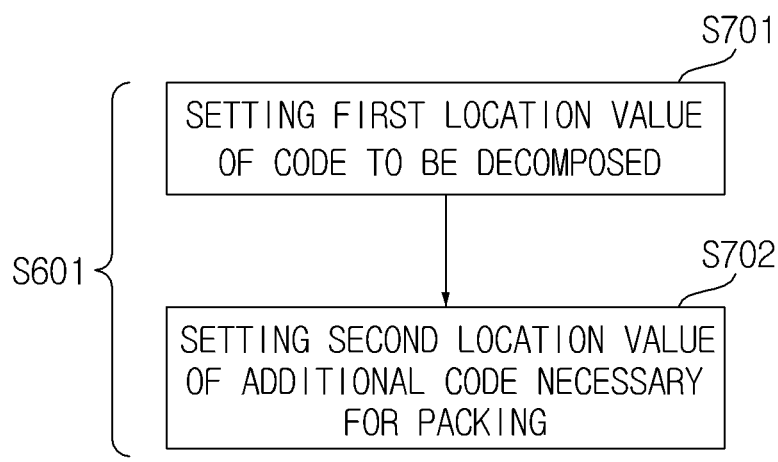
FIG. 7 is a view illustrating step S601 shown in FIG. 6 in more detail.

Further, for example, the analysis step S601 may be decomposed into two steps as shown in FIG. 7. The step S601 may include a step of setting the first location value of the code of the security program to be decomposed (S701), and a step of setting a second location value of an additional code necessary for packing the security program (S702).

Meanwhile, the encryption step (S603) may further include a step of receiving the encryption key from a second server connected to the server through a network.

The client configured according to an exemplary embodiment of the present invention and processing the security program by using the real-time key distribution method receives the packed program from the first server connected to the client through a network (S611). The packed program includes, for example, the code blocks encrypted by the server and the changed first header.

The client restores the original header from the changed first header of the packed program (S621), and performs an unpacking process on the packed program by using a decryption key received from the second server connected to the client through a network (S613). The decryption key corresponds to, for example, the encryption key used for the encryption of the code blocks.

Then, when the unpacking process performing step S613 is finished, the client performs the security program corresponding to the packed program (S614).

Moreover, for example, the reception step S611 further includes a step of primarily checking whether there is a possibility of hacking of the received packed program, and a step of controlling the restoration step to be performed only when there is no possibility of hacking. Further, the primary checking step is completed by determining whether an environment in which the received packed program is executed is exposed to hacking and whether there is a hacking tool.

Moreover, the reception step S613 may be implemented according to two exemplary embodiments. More specifically, according a first exemplary embodiment, the step S613 may further include a step of transmitting information on the client and the received packed program to the second server, and a step of receiving the decryption key from the second server only when the client has legal use authority. Meanwhile, according to a second exemplary embodiment, the step S613 may further include a step of receiving the decryption key from the second server determining whether the client has legal use authority by using an entitlement management message (EMM). Here, the second server corresponds to, for example, a key distribution server.

FIG. 8 is a flow chart illustrating a method of controlling a server and a client processing a security program by using a real-time key distribution method according to another exemplary embodiment of the present invention. Hereinafter, a method security program by using a real-time key distribution method according to another exemplary embodiment of the present invention will be described in chronological order with reference to FIG. 8. The method may be analyzed with reference to blocks shown in FIG. 3 if necessary.

A first server first analyzes a security program (S801). At this time, the first server determines an initial start location value of a code to be decomposed and which code is added to a program checking module necessary for packing.

After the analysis (S801), a code of the security program is decomposed into code blocks in a program decomposition process (S802) and the code blocks are encrypted (S803). The step S803 is performed by the first server. Also, an encryption code used in the step S803 is received from a second server (S811). The second server corresponds to, for example, a key distribution server connected to the first server through a network.

Meanwhile, a change process (S804) is performed on a header of the security program. That is, the header of the original security program and others are changed such that the program checking module is first executed before execution of the code included in the original security program. Then, the first server performs a packing process on the changed security program (S805), and transmits the packed security program to a client (S806).

The client receives the packed security program (S821), and drives the program checking module (S823) to perform primary checking on the security program about whether a problem is in an execution environment or whether a known hacking tool exists. In the case where there is no problem, the original header is restored (S825).

Then, the client asks the second server for a decryption key and a decryption key and receives the decryption key (S812), and decrypts the encrypted code blocks by using the decryption key (S822). In the case where the steps S825 and S822 are successfully finished, the client restores the execution location of the security program (S826). After restoring the execution location, the client finally executes the security program (S827).

Therefore, according to the exemplary embodiments of the present invention, for example, it is possible to safely transmit a download-based security program to provide pay broadcasting services in IPTV broadcasting, cable broadcasting, terrestrial broadcasting, satellite broadcasting, etc. This is possible by encrypting a part of a code through real-time key distribution to prevent an illegal user from executing the code.

Also, in an environment, such as terrestrial broadcasting, cable broadcasting, satellite broadcasting, and IPTV broadcasting, in which a conditional access system (CAS) is operated, it is possible to improve security by providing a function of controlling execution of a security program in coordination with a group key of the CAS. For example, an error possibility by hacking is removed by performing a key checking process whenever the security program is executed.

Meanwhile, in this specification, all of the product inventions and the method inventions are described, and the description of the product inventions and the description of the method inventions may be complementarily applied.

All of the methods according to the exemplary embodiments of the present invention may be implemented in a program command form capable of being executed through various computer means and be recorded in a computer-readable medium. The computer-readable medium may include program commands, data files, data structures, and the like, or a combination thereof.

The program commands recorded in the medium may be specifically implemented in order for the exemplary embodiments of the present invention or be well-known to and used by those skilled in the art.

Examples of the computer-readable medium include magnetic media such as a hard disk, a floppy disk, and a magnetic tape, optical media such as a CD-ROM and a DVD, magneto-optical media such as floptical disk, and hardware devices, such as a ROM, a RAM, a flash memory, specifically configured to store and execute program commands. Examples of the program commands includes not only machine language codes such as a machine language code generated by a compiler but also high-level language codes capable being executed in a computer by using an interpreter.

The hardware devices may be implemented to operate as one or more software modules in order to perform the operations of the exemplary embodiments of the present invention and the converse is established.

What is claimed is:

1. A method of controlling a server processing a security program by using a real-time key distribution method, comprising:
   analyzing, using a processor, the security program for transmitting the security program to a client, wherein the analyzing further includes setting a first location value of the code of the security program to be decomposed, and setting a second location value of an additional code necessary for packing the security program;
   decomposing a code of the analyzed security program into code blocks;
   encrypting the code blocks by using an encryption key;
   changing an original header of the security program to a first header; and
   transmitting a packed program including the encrypted code blocks and the changed first header to the client.

2. The method of claim 1, wherein the encrypting further includes receiving the encryption key from a key distribution server connected to the server through a network.

3. A method of controlling a client processing a security program by using a real-time key distribution method, comprising:
   receiving a packed program from a first server connected to the client through a network, the packed program including an encrypted code and a changed first header, wherein the receiving further includes primarily checking whether there is a possibility of hacking of the received packed program, and controlling the restoring to be executed only when there is no possibility of hacking;
   restoring an original header from the changed first header of the packed program;

unpacking the packed program by using a decryption key received from a second server, the decryption key corresponding to an encryption key used for the encrypted code; and executing a security program corresponding to the packed program when the unpacking is finished.

4. The method of claim 3, wherein the primary checking determines whether an environment in which the received packed program is executed is exposed to hacking and whether a hacking tool exists.

5. The method of claim 3, wherein the executing further includes transmitting information on the client and the received packed program to the second server, and receiving the decryption key from the second server only when the client has legal use authority.

6. The method of claim 3, wherein the executing further includes receiving the decryption key from the second server determining whether the client has legal use authority by using an entitlement management message (EMM).

7. The method of claim 3, wherein the second server corresponds to a key distribution server.

8. A server processing a security program by using a real-time key distribution method, comprising:

an analysis module analyzing the security program for transmitting the security program to a client, wherein the analyzing further includes setting a first location value of the code of the security program to be decomposed, and setting a second location value of an additional code necessary for packing the security program;

a decomposition module decomposing a code of the analyzed security program into code blocks;

an encryption module encrypting the code blocks by using an encryption key;

a changing module changing an original header of the security program to a first header; and a transmitting module transmitting, using a processor, a packed program including the encrypted code blocks and the first header to the client.

9. The server of claim 8, wherein the analysis module sets a first location value of the code of the security program to be decomposed and sets a second location value of an additional code necessary for packing the security program.

10. The server of claim 8, wherein the encryption module uses the encryption key received from a key distribution server connected to the server through a network.

11. A client processing a security program by using a real-time key distribution method, comprising:

a reception module receiving, using a processor, a packed program from a first server connected to the client through a network, the packed program including an encrypted code and a changed first header, wherein the reception module further includes a checking module primarily checking whether there is a possibility of hacking of the received packed program, and a controller controlling the restoration to be performed only when there is no possibility of hacking;

a restoration module restoring an original header from the changed first header of the packed program;

an unpacking module performing an unpacking process on the packed program by using a decryption key received from a second server, the decryption module corresponding to an encryption key used for the encrypted code; and an execution module executing a security program corresponding to the packed program when the unpacking process is finished.

12. The client of claim 11, wherein the checking module determines whether an environment in which the received packed program is executed is exposed to hacking and whether a hacking tool exists.

13. The client of claim 11, wherein the second server corresponds to a key distribution server.

* * * * *